United States Patent [19]

Hennecke et al.

[11] Patent Number: 4,821,189
[45] Date of Patent: Apr. 11, 1989

[54] METHOD FOR THE DAMPING FORCE ADJUSTMENT OF MOTOR VEHICLES AS A FUNCTION OF OUTPUT SIGNALS OF A TRANSMITTER ARRANGED AT THE VEHICLE BODY

[75] Inventors: Dieter Hennecke, Reichertshausen; Eugen Herb, Munich; Udo Ochner, Munich; Bernd Jordan, Munich, all of Fed. Rep. of Germany

[73] Assignee: Bayerische Motoren Werke A.G., Munich, Fed. Rep. of Germany

[21] Appl. No.: 100,893

[22] Filed: Sep. 25, 1987

[30] Foreign Application Priority Data

Sep. 27, 1986 [DE] Fed. Rep. of Germany ....... 3632920

[51] Int. Cl.$^4$ .............................................. B60G 11/26
[52] U.S. Cl. .................................. 364/424.05; 280/707
[58] Field of Search ................. 364/424; 280/678, 707

[56] References Cited

U.S. PATENT DOCUMENTS 4,693,494  9/1987  Buma et al. .................... 364/424 X
4,700,971  10/1987  Doi et al. ........................ 364/424 X

FOREIGN PATENT DOCUMENTS 3619903  12/1986  Fed. Rep. of Germany .

Primary Examiner—Eugene R. LaRoche
Assistant Examiner—David Mis
Attorney, Agent, or Firm—Barnes & Thornburg

[57] ABSTRACT

In a method for the damping force adjustment of motor vehicles in dependence of output signals of a transmitter arranged at the vehicle body which are processed and are compared with a predetermined threshold value and which produce a signal for changing the damping force when exceeding/dropping below this threshold value, the changes of these output signals are added at equal intervals with respect to time and determined over a measuring period which is considerably larger than the natural period (reciprocal resonance frequency) of the vehicle wheels and are compared with a threshold value which is dependent on the load of the vehicle. A drift-free indication about the damping force adjustment to be selected becomes possible therewith without frequency analysis.

9 Claims, 4 Drawing Sheets

TIME

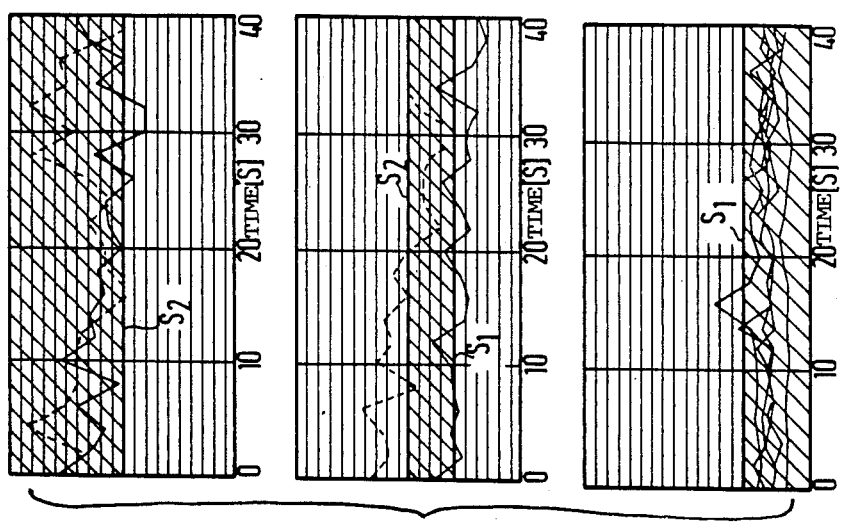
Fig. 3b) LOAD: PERMISSIVE REAR-AXLE LOAD
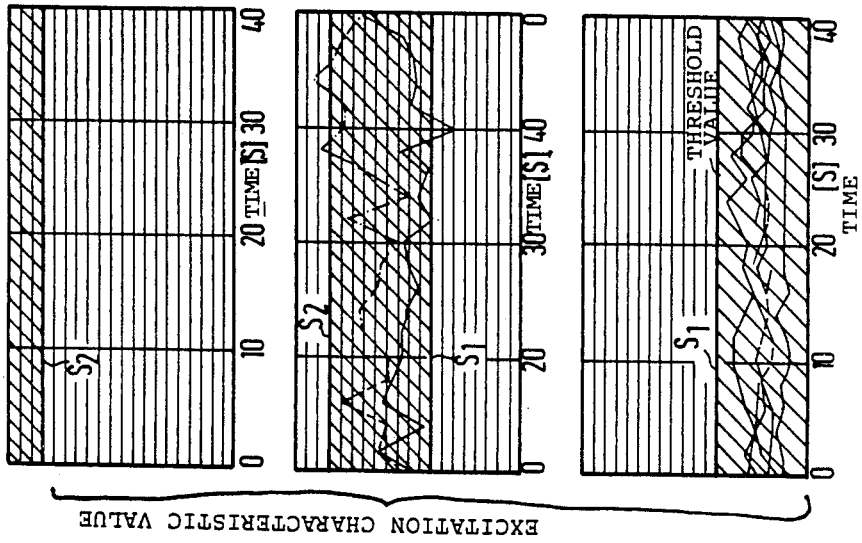
Fig. 3a) LOAD: EMPTY

METHOD FOR THE DAMPING FORCE ADJUSTMENT OF MOTOR VEHICLES AS A FUNCTION OF OUTPUT SIGNALS OF A TRANSMITTER ARRANGED AT THE VEHICLE BODY

BACKGROUND AND SUMMARY OF THE INVENTION

The present invention relates to a method for the damping force adjustment of motor vehicles in dependence on output signals of a transmitter or pick-up arranged at the vehicle body which are processed and which trigger a signal for changing the damping force when exceeding/dropping below a predetermined threshold value.

In a known method of this type (EP No. 01 51 421-A) the output signals of the transmitter are analyzed as regards their frequency. The damping force adjustment takes place in dependence of the preferred low-frequency component. This component is representative for the vibrations or oscillations of the vehicle body. In contrast thereto is a higher frequency component which is representative for the vibrations or oscillations of the vehicle wheel, respectively of the vehicle wheels.

At the outset, the technical measurement expenditures are relatively high with the known method because the evaluation of the transmitter-output signal is possible only with the aid of a relatively costly frequency analysis by means of a series-connected processing device connected in the output thereof. Added thereto is the fact that drift occurrences of the used electronic components have a considerable influence on the measurement result. Provision is made to eliminate this influence by matching the two threshold values determinative for the respective frequency components corresponding to the output signal of the control apparatus. This, however, leads to a further increase of the expenditure with the additional effect that the manner of operation of the method is no longer reproducible.

The present invention is concerned with the task to provide a method of the aforementioned type, by means of which it is possible in a simple manner which can be readily monitored, to undertake the shifting between at least two damping force steps.

The underlying problems are solved according to the present invention in that the changes of the output signals of the transmitter which are measured at equal intervals with respect to time, are added and are determined over a measuring period which is considerably greater than the natural period of the vehicle wheels and which are compared with a threshold value that is dependent on the load. The thus-obtained magnitude will be referred to hereinafter as duration dynamic characteristic value (DDK).

By taking into consideration only the changes with respect to time of the output signals of the transmitter, drift appearances of the electronic components are completely eliminated. A frequency analysis also is not necessary because for carrying out the method only the numerical subtraction of successive measurement values is necessary. The consideration of the load for the adjustment of the threshold value, on the one hand, is possible coupled with low expenditure and therebeyond offers a significant functional advantage. The latter rests on the fact that, for example, at large load, an adjustment of the damping force in the direction "hard" is necessary considerably earlier, i.e., at road conditions at which without load a comfortable, respectively, more comfortable damping force adjustment, is still acceptable.

By taking into consideration the change with respect to time of the output signals of the transmitter, it also becomes possible to differentiate between the different influences on the comfort behavior of a motor vehicle and to take into consideration exclusively the determinative components. The magnitudes influencing the DDK-value only as regards its level are the driving velocity and the road unevenness whereas the load and the respectively adjusted damping force step affect the DDK-value calculated from the signals of the transmitter only in the form of a certain dispersion width. Conclusions can thus be drawn with respect to the excitation condition, which results from the road surface and the driving velocity, exclusively from the level of the DDK-values.

If the calculated DDK-values exceed load-dependent thresholds, the shifting takes place into another damping force step.

As a determination of the load condition is not readily possible from the curve of the DDK-value, an additional sensor is provided for this purpose. For example, in vehicles with a level regulation the sensing of the system pressure offers itself for this purpose.

It may be desirable to undertake the adjustment of the damping force in more than two steps, for example, in three steps. In this case, threshold values for the transition between adjacent damping force-adjusting steps may be load-dependent. The number of the possible steps, however, is not limited so that with a corresponding large number of steps, this leads to a quasi-continuous, respectively, continuous damping force adjustment.

Finally, further parameters determinative for the damping force adjustment can be taken into consideration. They include thereby the outside temperature which has a determinative influence on the viscosity of the oil used customarily in dampers and therewith also on the adjusted damping force. The mentioned threshold values are changed temperature-dependent in order to prevent a shifting into an unnecessarily hard damping force step at low temperatures.

The steering angle, the vehicle cross-acceleration, respectively, a substitute magnitude calculated from the driving velocity and steering angle may be utilized as further parameter for changing the mentioned threshold value.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein:

FIGS. 3a and 3b are each three diagrams for explaining the relationship between load of the vehicle and three provided damping force steps in the method according to the present invention.

DETAILED DESCRIPTION OF THE DRAWINGS

Figure 1:
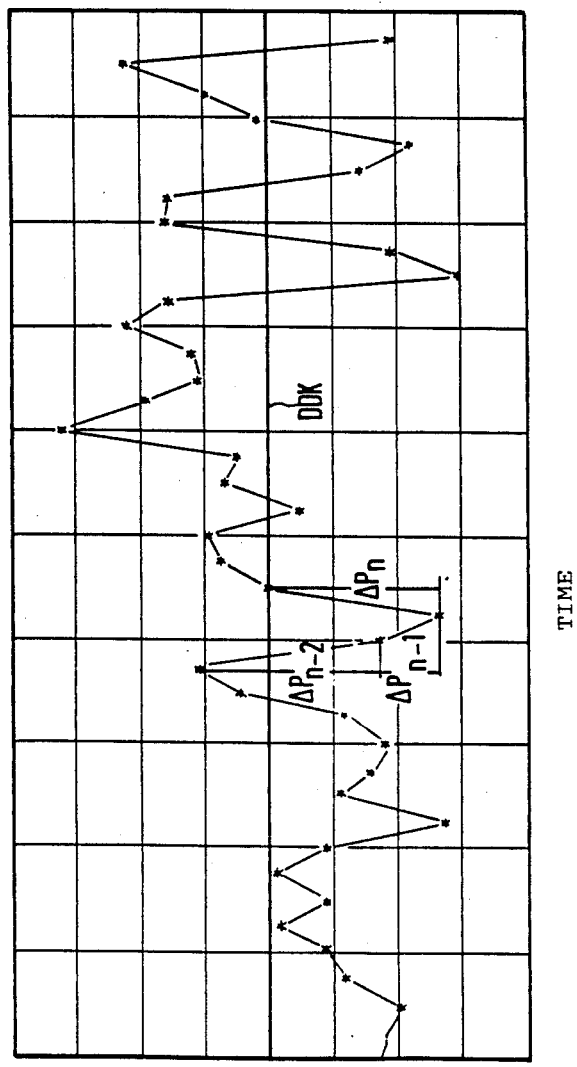
FIG. 1 is a diagram explaining the measuring method in accordance with the present invention.

Referring now to the drawing, the diagram of FIG. 1 illustrates the output signals, measured at equal intervals with respect to time, of a transmitter or pick-up arranged at the body of a motor vehicle. This transmitter or pick-up may be an acceleration transmitter or pick-up or an interval transmitter or pick-up with series-connected differentiation stages. For the sake of simplicity reference will be made hereinafter only to an acceleration transmitter though the present invention is not limited thereto.

The output signals of this acceleration transmitter have the illustrated curve. At uniform intervals with respect to time, the numerical differences of two successive output signal values are determined and are added over a predetermined time and are outputted as mean or average value. The spacing with respect to time, in which the successive measuring points are taken into consideration, is considerably smaller than the resonance frequency (about 1-2 Hz) characteristic for the vibrations or oscillations of the vehicle body. The measurement period over which the mean or average value is determined, on the other hand, is considerably larger than the natural vibration duration of the vehicle body. It becomes possible therewith to obtain without costly frequency analysis and corresponding frequency filters, a signal for the damping force adjustment which can be determined in a simple manner. If this signal is greater than a predetermined threshold value, then the shifting of the damping force takes place in the direction "hard". If this signal is then again smaller than this threshold value, then a shifting of the damping force in the direction "soft" takes place, possibly taking into consideration a delaying period for preventing an excessively rapid change of the damping force adjustment.

Figure 2:
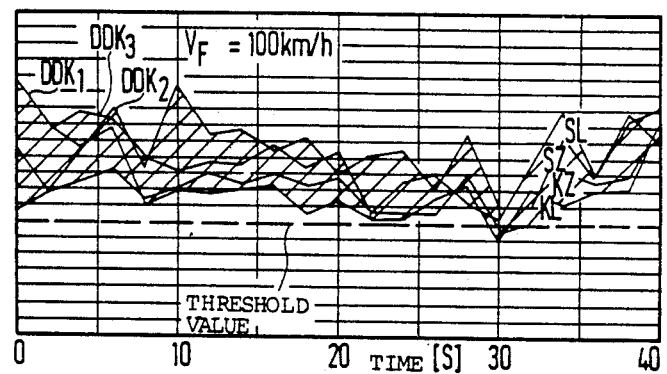
FIGS. 2a and 2b are diagrams for explaining the relationship between the determinative influencing magnitudes and the output signals of a utilized transmitter in the method according to the present invention.
Figure 2:
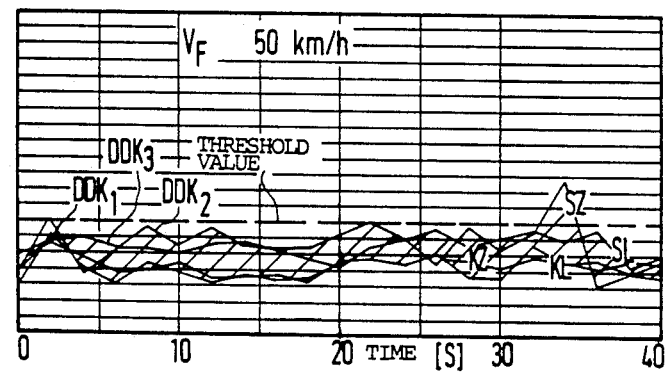

The diagram of FIG. 2 shows, with reference to a threshold value, in its two parts a and b the curve with respect to time of the DDK-values with three road surfaces having at least approximately identical road surface properties and only different vehicle velocities. The part a is thereby based on a velocity of 100 km/h while the Part b is based on a velocity of 50 km/h. The plotting of the DDK-value is made in the instant case over the time period of 40 seconds. The comparison of the two diagrams illustrates that the curve of the DDK-values varies in two respects. On the one hand, at higher velocity, the level is higher than at lower velocity and, on the other, the adjustment of the shock absorber and the load have an influence. However, the latter effect only an enlargement of the band width of the DDK-signals. Nonetheless, FIG. 2 shows clearly that independently of the band width of the DDK-value, conclusions as regards the excitation condition from the road surface and driving velocity can be drawn exclusively from the level of the DDK-value.

FIG. 3 illustrates in its parts a and b the influence of the load on the threshold values for shifting into another damping force step. The part a thereby refers to the load "empty" and the part b to a load which is equal to the permissive rear axle load. If one compares the two lowermost diagrams of the parts a and b, then the area is reproduced in the same in cross-hatching, in which the DDK-value determined with the aid of the method described by reference to FIG. 1 is smaller than a predetermined threshold value. It can be recognized clearly that this area is larger with an empty motor vehicle than with a loaded motor vehicle.

A wider area adjoins this area in which a comfortable damping force adjustment is possible: a "normal" range that is one lying between a comfortable and a sporty damping force adjustment, is coordinated to this wider area. The determined DDK-value lies within this area between the threshold value $S_1$ determinative for the end of the comfortable range and a threshold value $S_2$, at which the adjustment of the damping force must take place in a sporty stiff manner. This area emphasized by cross-hatching in the middle diagram of the parts a and b is considerably larger with an empty motor vehicle and lies noticeably higher than with a loaded vehicle.

A third area for the sporty-stiff damping force-adjustment adjoins the normal damping force-adjustment, which is indicated in cross-hatching in the two upper diagrams. Only at a high load, DDK-values exist therein, which vary more strongly with respect to time than in the two other damping force adjustments. The beginning of this area is clearly different from one another as a function of load.

Figure 4A:
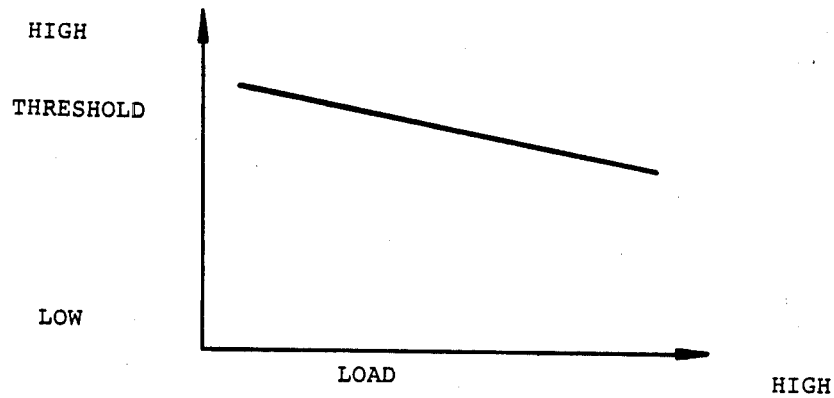
FIG. 4 is a diagram indicating the relationship in principle between the influencing magnitudes and shifting-threshold values matched thereto for the damping force steps in the method according to the present invention.
Figure 4B:
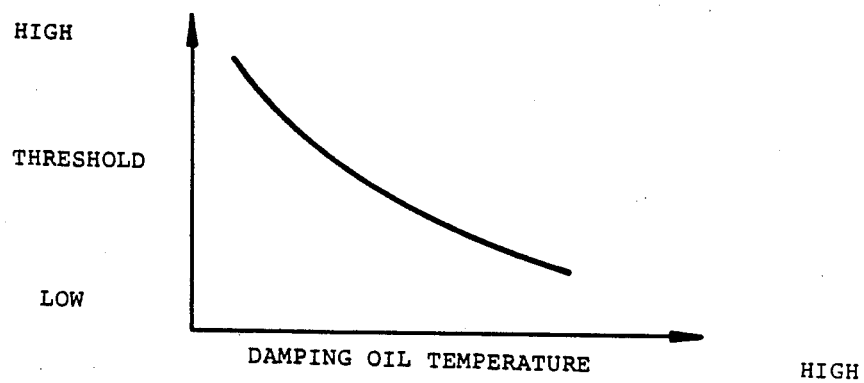
Figure 4C:
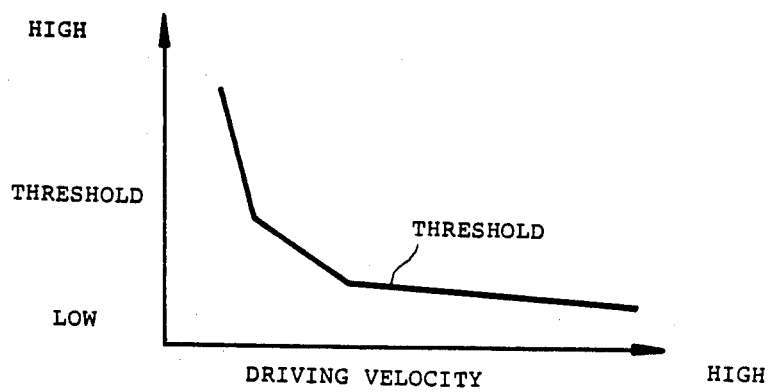

The influence in principle of parameters possibly to be considered in addition to the load, for the shifting-threshold values for the adjustment of the different damping force steps is indicated in FIG. 4 by reference to a road, for example, for the transition from comfortable to middle damping force. The first diagram once again indicates the influence of the load. According thereto, at high load, the shifting threshold is to be selected lower than at low load.

The middle diagram indicates the consideration of a relevant temperature. The damper oil temperature, which is effective directly, is selected in lieu of the outside temperature. At low temperature, the transition to middle damping force can be determined by a considerable higher shifting threshold than at higher temperature.

Finally, the lower diagram shows that the transition to a more strong damping force at higher velocity is determined by a lower shifting threshold than at lower velocity.

As the circuits necessary to carry out the method in accordance with the present invention are known to those skilled in the art and involve only commercially available components, a detailed description thereof is dispensed with herein.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A method for the damping force adjustment of motor vehicles in dependence on output signals of a transmitter arranged at a vehicle body, which are processed and initiate a signal for changing the damping force when exceeding/dropping below a predetermined threshold value, comprising the steps of adding the changes of the output signals of the transmitter measured in equal intervals with respect to time and determining the same over a measuring period which is considerably larger than the natural period of the vehicle wheels, and comparing the same with a threshold value that is dependent on the load.

2. A method according to claim 1, in which a further transmitter is provided whose output signal is an indication for the load of the vehicle, further comprising the step of changing the threshold value by means of the output signal of the further transmitter.

3. A method according to claim 2, in which with a damping force adjustment in three steps, the two threshold values determinative for the transition of two steps are dependent on load.

4. A method according to claim 3, wherein the threshold value or values are dependent on at least one of outside temperature, vehicle velocity and steering angle.

5. A method according to claim 4, wherein the threshold values, respectively, magnitudes can be used for the control of a continuous damping force adjustment.

6. A method according to claim 1, in which with a damping force adjustment in three steps, the two threshold values determinative for the transition of two steps are dependent on load.

7. A method according to claim 1, wherein the threshold value or values are dependent on at least one of outside temperature, vehicle velocity and steering angle.

8. A method according to claim 1, wherein the threshold values, respectively, magnitudes can be used for the control of a continuous damping force adjustment.

9. A method according to claim 1, wherein the threshold value or values are dependent on outside temperature, vehicle velocity and steering angle.

* * * * *